United States Patent [19]
Evers et al.

[11] Patent Number: 5,259,810
[45] Date of Patent: Nov. 9, 1993

[54] INSTALLATION FOR PROCESSING FLATFISH

[75] Inventors: Reinhard Evers, Stockelsdorf; Conrad Torkler, Hakendorf; Klaus-Werner Gotz, Stockelsdorf, all of Fed. Rep. of Germany

[73] Assignee: Nordischer Maschinenbau Rud. Baader GmbH & Co. KG, Lubeck, Fed. Rep. of Germany

[21] Appl. No.: 966,547

[22] Filed: Oct. 26, 1992

[30] Foreign Application Priority Data

Oct. 26, 1991 [DE] Fed. Rep. of Germany ....... 4135353

[51] Int. Cl.⁵ .................. A22C 25/18; B65G 42/24
[52] U.S. Cl. ................... 452/149; 452/170; 452/179; 452/180; 452/182
[58] Field of Search ............. 452/149, 108, 161, 170, 452/179, 180, 182

[56] References Cited

U.S. PATENT DOCUMENTS

| | | | |
|---|---|---|---|
| 1,920,339 | 8/1933 | Baader | 452/179 |
| 2,507,808 | 5/1950 | Oates | 452/149 |
| 3,380,114 | 4/1968 | Hartl et al. | 452/179 |
| 3,399,422 | 9/1968 | Hartl et al. | 452/108 |
| 3,919,741 | 11/1975 | Backhaus et al. | 452/170 |
| 4,476,610 | 10/1984 | Wenzel | 452/170 |
| 4,630,334 | 12/1986 | Evers et al. | 452/179 |
| 4,811,462 | 3/1989 | Meyn | 452/134 |
| 5,090,941 | 2/1992 | DeChow | 452/182 |
| 5,192,243 | 3/1993 | Weustink | 452/157 |

FOREIGN PATENT DOCUMENTS

| | | |
|---|---|---|
| 1203058 | 4/1986 | Canada . |
| 492627 | 2/1930 | Fed. Rep. of Germany . |
| 1292818 | 7/1969 | Fed. Rep. of Germany . |
| 1579417 | 3/1971 | Fed. Rep. of Germany . |
| 2349660 | 4/1975 | Fed. Rep. of Germany . |
| 1432560 | 6/1966 | France . |
| 1376624 | 12/1974 | United Kingdom . |
| 1518267 | 7/1978 | United Kingdom . |
| 2100578 | 1/1983 | United Kingdom . |

Primary Examiner—Willis Little
Attorney, Agent, or Firm—Fay, Sharpe, Beall, Fagan, Minnich & McKee

[57] ABSTRACT

An installation for processing flatfish, in particular for severing the head, and, if necessary, the tail thereof, comprises a feeding device (1), means for aligning the fish and means for conveying the same in rest position on one of their sides through the operative area of processing tools. The installation can be characterized in that the conveying means (13) is provided with entrainers (14) which engage the fish at its flank remote of that lying on the support surface (16), and are controlled to turn about an axis which is perpendicular to said support surface (16). Each fish is taken over by the entrainer (14) with attention being paid to a detected measured value with respect to its size such that the point of engagement of the entrainer is uniform independent of the size.

11 Claims, 1 Drawing Sheet

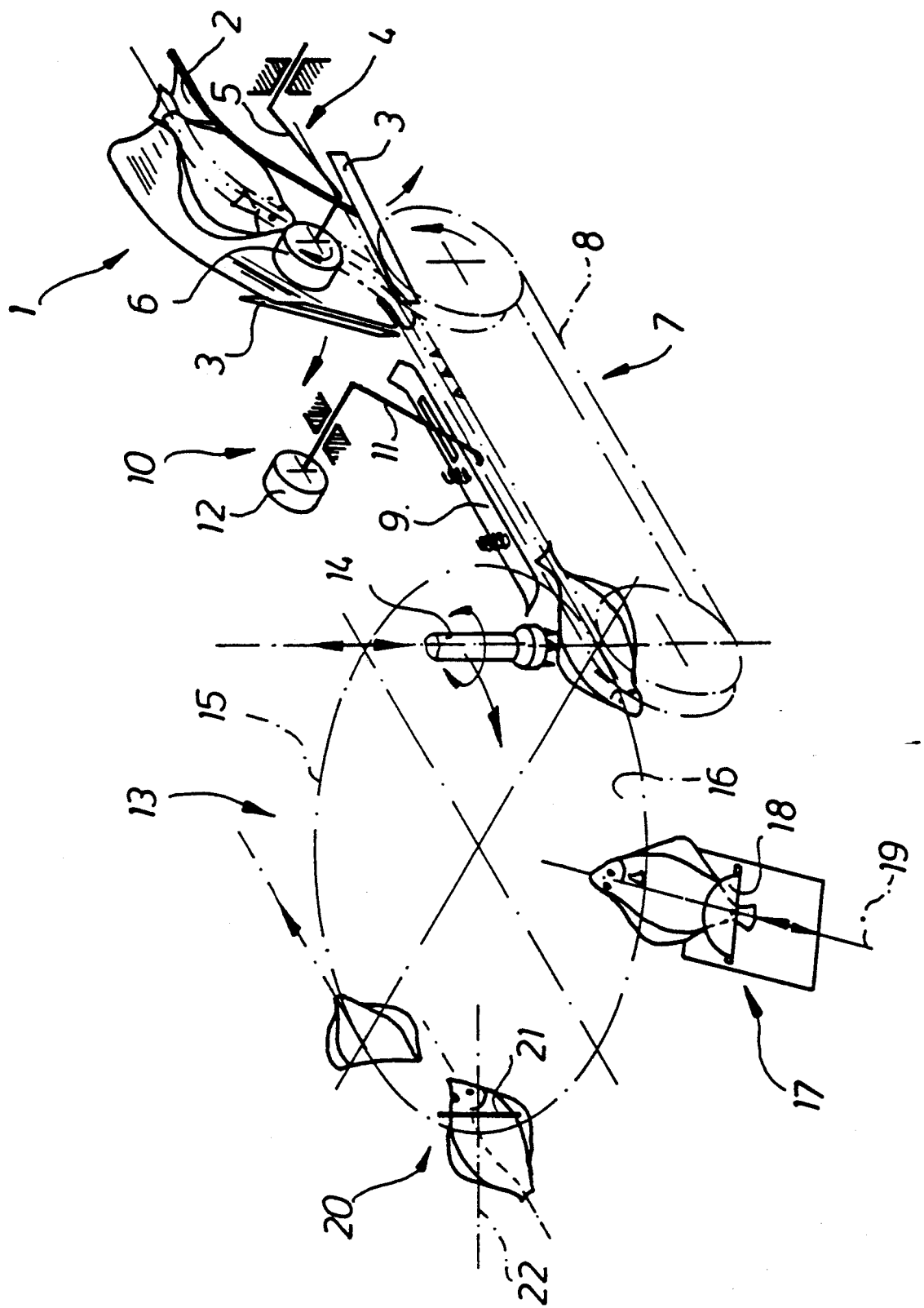

INSTALLATION FOR PROCESSING FLATFISH

BACKGROUND OF THE INVENTION

1. Field of the Invention

The invention relates to an installation for processing flatfish, in particular for severing their head, possibly their tail and/or for performing similar processing steps, the installation comprising a feeding device, means for aligning the fish to the respectively required processing position, as well as means for transporting the fish in a position lying on their sides through the operative area of corresponding processing tools which are arranged along the path of the conveying means.

2. Prior Art

Such an installation is known from the prior art as put into practice, which is at least partly shown by published documents DE-Patent 1292818 and DE-Patent 1579417. These documents concern devices for decapitating and filleting flatfish, with the second document showing a feeding device which, apart from aiming at the timed passing-on of the fish also aims at aligning the same for this passing-on. The fish supplied in the direction of its longitudinal extension is brought, in a timed manner, into the region of an aligning station in which the aligning is effected by the cooperation of a head catch and fish pushing elements, with the latter being kinematically coupled with the head catch, and subsequently a timed transfer occurs to a tail clamp conveyor which conveys the fish through a filleting machine as shown in DE-Patent 1292818.

Furthermore, U.S. Pat. No. 2,507,808 discloses a device for the head position adjustment of fish which, lying on their sides, are advanced transversely to their longitudinal axis. This device comprises a displacement unit for advancing each fish into its decapitating position. The displacement is performed by entrainers engaging the rump side edge of the shoulder girdle arch of the fish after this conveyor has been brought into contact with the flank of the fish and has been guided along this while sliding towards the head. The displacement is ended by moving the entrainer out of contact away from the fish when the desired decapitating position is reached. There is no conveying of the fish by means of the displacement device through the operative region of the processing tools.

The detaching of the head by severing can e.g. be taken from DE-Patent 2349660 which shows a device by which the head is removed by means of an angle cut conventional in the case of flatfish and also including the greatest part of the belly cavity.

These known devices are no longer regarded fully appropriate in view of today's requirements with respect to processing throughput rate and yield, while, on the other hand, the precision which is possible is unsatisfactory. This means a loss in yield which today is no longer tolerable, which loss is also added to by the shape of the decapitation cut.

3. Object of the Invention

It is therefore a main object of the present invention to suggest an installation which overcomes the drawbacks of the prior art as described above.

It is a particularly important object of the invention to enable the performance of a cut and thus guarantee that each fish can pass the processing procedure in an optimal position independent of its size.

SUMMARY OF THE INVENTION

The invention is based on the finding that an increase in yield can be obtained by a decapitation cut carried out in a single plane if a well-determined angular position relative to the longitudinal axis of the fish and taking into consideration the anatomic conditions, as well as a size-dependent position relative to the longitudinal position are maintained.

In an installation comprising means for feeding the flatfish, means for aligning them to adopt a required processing position, means for conveying the flatfish while resting on one of their sides, and processing tools for carrying out the necessary cuts, the above objects are achieved in that the conveying means for conveying the flatfish through the operative area of the processing tools comprise at least one entrainer which is adapted to engage the flatfish by the other one of their sides remote the one they rest on, by a form-fit engagement, each entrainer being designed for controlled turning or pivoting about an axis extending essentially perpendicularly with regard to the support surface on which the fish rests, and each entrainer being arranged for controlled spacing movement relative to such support surface.

Particular advantages to be obtained thereby consist in the possibility of precisely controlling the position and thus achieving a high throughput rate and also in that a transfer of the fish to subsequent processing machines, particularly to a filleting machine, may occur in any desired position, which may be repeated at high precision.

It is possible to obtain a rather compact structure of the installation by guiding each entrainer of the conveyor at constant speed along a circular path and by lowering it at a defined position of this circular path, which defined position lies in the area of the feeding means.

According to an embodiment of the present invention which is advantageous with regard to security and ergonomics, the feeding device comprises a feeding station for receiving the flatfish and supplying them in an aligned position in accordance with their longitudinal extension, and means for a timed releasing of the fish from this feeding station. In this embodiment a supply conveyor is arranged downstream of the feeding means, which conveyor receives and takes over the flatfish released in a timed manner towards the path of rotation of the entrainers by conveying them in their longitudinal direction in form-fit or positive engagement, with the conveying path of the supply conveyor extending tangentially or radially with respect to the circular path of the entrainers.

In order to safeguard that each fish is seized independent of its size at a reference point of its body which is uniform for the intended processing by the entrainers of the conveyor, it is expedient to arrange detecting means for detecting a significant length dimension of the flatfish seized by the supply conveyor and to control the speed of the supply conveyor depending on the measured value detected in each case by the detecting device. An appropriate position for seizing each fish by the respective entrainer is seen in the tangent point or the point of intersection between the path of the supply conveyor and the path of the entrainers.

Selecting the point of seizing the fish by the entrainers as well as the controllability of the angle of turning of the entrainers during their engagement of the fish merely require that the processing tool for severing the tail be individually controllable with regard to the distance of the tail from the path of the entrainers which may be obtained by evaluating the measuring value detected by the detecting device. In contrast thereto, the processing tool for detaching the head by severing may be arranged fixedly on e.g. the frame of the machine or installation.

BRIEF DESCRIPTION OF THE DRAWING

Other and further objects of the present invention will be apparent from the following description and claims and are illustrated in the accompanying drawing which by way of illustration schematically shows a preferred embodiment of the present invention and the principles thereof and what now is considered to be the best mode contemplated for applying these principles. Other embodiments of the invention embodying the same or equivalent principles may be used and structural changes may be made as desired by those skilled in the art without departing from the present invention and the scope of the appended claims.

The drawing comprises one FIGURE showing, in a diagrammatic manner, an axonometric representation of the structure of an installation working in accordance with the present invention.

DETAILED DESCRIPTION OF THE PREFERRED EMBODIMENT

An installation according to the present invention comprises, at an input end thereof, a feeding device 1 including an inclined feeding chute 2, whose cross section has a structure that a flatfish to be processed slides downwardly while being guided centrally and aligned in its longitudinal direction. At the end area of the feeding chute 2 there is arranged a pair of catch flaps 3 which can be actuated to pivot in a suitable manner. These catch flaps 3 are arranged symmetrically with regard to the center of the feeding chute 2 and converge in a feeding direction by being designed to have a V-shaped position. In their rest position, the catch flaps 3 leave merely a narrowed passage, which is small enough to hold back even the smallest flatfish of a batch of fish to be processed. The V shaped angle of the catch flaps 3 is adapted to the anatomy of the head area of the fish and the adjacent rump area. A timer 4 is arranged above the feeding chute 2. This timer comprises a conveying roller 6 which is mounted on a rocker arm 5 and is driven to rotate. This conveying roller 3 can be lowered onto the fish lying in a ready-position in the feeding chute 2. This lowering occurs in a timed manner by means of an appropriate actuating element, the catch flaps 3 being controlled to move in an outward direction simultaneously.

The feeding chute 2 is followed by a supply conveyor 7, which comprises a driven lower endless chain conveyor 8 and a holding-down device 9 arranged thereabove and in a manner to be displaceable resiliently in an upward direction. The chain conveyor 8 comprises two chains running parallel to each other and being designed for gripping by being equipped with teeth. The holding down device 9 includes a cut-out portion, through which a detecting device 10 having a detecting lever 11 extends into the path of the fish. An angle coder 12 is associated with a pivot axis of said detecting lever 11. For driving the chain conveyor 8 a non shown stepping motor is provided.

In the second quadrant of the support surface 16 which the entrainer 14 overruns there is provided a further processing tool 20 for detaching the head of the fish by severing. This tool comprises a circular knife 21 which is driven to rotate and projects through the support surface 16 from underneath. This circular knife 21 is arranged in a frame-fixed manner inside the circular path 15 of the entrainers 14 and has an axis 22 which extends radially with regard to the center of the circular path 15.

The function of the installation according to the present invention will now be described by way of a fish passing through the processing, which fish, for this purpose and as shown in the drawing, is placed in the feeding chute 2 with its head leading and with the conveying roller 6 being pivoted to an upper position. Due to gravity, the fish slides against the catch flaps 3 which are in their catch or abutment position to retain and center it. By a timing signal, which is synchronized with the conveying device 13 becoming operative at a later time the catch flaps 3 are now opened, and simultaneously the conveying roller 6, which is positioned above the fish held ready, is brought into contact with the fish by lowering of the roller.

The result of this action is that the fish is accelerated and proceeds into the area of the supply conveyor 7 which receives the fish with its chain conveyor 8, the holding-down device 9 enabling the teeth of the chain conveyor 8 to engage the fish in a form fit or positive manner. While the fish is being advanced by the supply conveyor 7 it causes the detecting lever 11 of the detecting device 10 to pivot, whereas the longitudinal profile of the fish, i.e. its profile in the longitudinal direction, is registered by the angle coder 12 associated with the detecting lever 11. Due to a certain spring-bias of the detecting lever 11 a height displacement results after the sliding movement over the head structure of the fish by the fact that the detecting lever 11 engages the area of the softer belly cavity after having passed the harder structure of the head. The longitudinal extension or dimension of the head structure measured in this manner is computed and evaluated by an associated computer in a manner that the speed of the chain conveyor 8 is varied depending on the detected measured value. The dependency is such that a larger fish effects an acceleration, whereas a smaller fish causes a deceleration. The purpose of this variability is to present each fish to the subsequent conveying device 13 such that the take-over by the entrainers 14 thereof occurs at a uniform reference point of the fish body in each case, which point is defined by the position of the fixedly arranged decapitating tool 20 and a decapitating cut which is to be performed with this tool at favorable yield.

The take-over of the fish from the supply conveyor 7 occurs by that entrainer 14 of the conveying device 13, which is lowered onto the fish at the tangent point or point of intersection between the path of the supply conveyor 7 and the circular path 15 of the entrainers 14. The engagement with the fish occurs in a form-fit/positive manner, so that a safe entraining is guaranteed. When the take-over of the fish occurs above said tangent point, the fish immediately thereafter is turned about its longitudinal axis by turning the entrainer 14 so that well in time before arriving at the tail cut tool 17 the fish points radially outwardly with its tail. If, however, the take-over of the fish occurs in the case of the mentioned point of intersection at such point, the fish is conveyed further lying in transverse position so that the tail-cut tool 17 can become operative without a previous turning of the fish. Before coming into action, this tool has been controlled to take a position which has been computed by the computer by means of the measured value detected by the detecting device 10, which position safeguards that the tail cut is carried out at the desired place. After having passed the tail-cut tool 17, the fish is pivoted into the decapitating position by a further turning of the entrainer 14. The cutting angle relative to the longitudinal axis of the fish is determined such that attention is paid to an optimum relationship between the yield and the anatomy of the fish.

After the processing has taken place as described, the entraining of the fish by the entrainer 14 may be maintained, and it is thus made possible that the fish is brought into a defined final position by a corresponding further turning of the entrainer 14, in which final position the fish is released from the machine. In the case of a possible subsequent filleting processing by means of a filleting machine having e.g. a vertically extending processing path, this final position may be a position in which the tail portion of the fish is leading. The fish may then be released above the entrainer's feeding zone arranged in the area of the circular path 15, and it may thus be further processed in an automatic manner.

We claim:

1. An installation for processing flatfish, in particular for performing severing steps to detach at least one of the heads, tails and similar fish portions requiring cutting-off, said installation comprising feeding means for feeding said flatfish;

means for aligning said flatfish to adopt a required processing position;

support surface means for supporting said flatfish at least during part of said processing;

conveying means for said flatfish defining a conveying path and conveying said flatfish in a position resting on a first one of their sides on said support surface means; and processing tools defining an operative area of said installation and arranged along said conveying path for processing said flatfish when conveyed by said conveying means, wherein said conveying means for conveying said fish through said operative area of said processing tools comprise at least one entraining component which is adapted to engage said flatfish by a second one of their sides remote from said first side and said surface means, in a form-fit manner to safeguard its slip-free turning of said fish, said entraining component being designed for controlled turning about an axis extending essentially perpendicular to said support means, and for controlled spacing relative to said support surface means.

2. An installation as claimed in claim 1, wherein said at least one entraining component of said conveying means is arranged for guided movement at constant speed along a circular path and for lowering at a defined position of said circular path, which position lies in the area of said feeding means.

3. An installation as claimed in claim 1, in which said feeding device comprises a feeding station for receiving said flatfish and supplying them in an aligned manner in accordance with their longitudinal position, said feeding station including means for a timed releasing of said flatfish from said feeding station, wherein downstream of said feeding means supply conveyor means are arranged which receive said flatfish released in a timed manner towards said path of rotation of said entraining components by conveying them in their longitudinal direction in form-fit engagement, said supply conveyor means defining a supply path which is one of essentially tangential and radial to said circular path of said at least one entraining component.

4. An installation as claimed in claim 2, in which said feeding device comprises a feeding station for receiving said flatfish and supplying them in an aligned manner in accordance with their longitudinal position, said feeding station including means for a timed releasing of said flatfish from said feeding station, wherein downstream of said feeding means supply conveyor means are arranged which receive said flatfish released in a timed manner towards said path of rotation of said entraining components by conveying them in their longitudinal direction in positive engagement, said supply conveyor means defining a supply path which is one of essentially tangential and radial to said circular path of said at least one entraining component.

5. An installation as claimed in claim 3, wherein detecting means for detecting at least a significant portion of the length dimension of each of said flatfish seized by said supply conveyor means is arranged in the area of said supply conveyor means, and wherein said supply conveyor means is associated with control means for controlling its speed in dependency on a measured value detected by said detecting means such that each fish can be seized by said at least one entrainer component independent of its size at a reference point of its body which point is uniform for the intended processing, said seizing being performed when said at least one entrainer component is lowered into the path of said of flatfish.

6. An installation as claimed in claim 4, wherein detecting means for detecting at least a significant portion of the length dimension of each of said flatfish seized by said supply conveyor means is arranged in the area of said supply conveyor means, and wherein said supply conveyor means is associated with control means for controlling its speed in dependency on a measured value detected by said detecting means such that each fish can be seized by said at least one entrainer component independent of its size at a reference point of its body which point is uniform for the intended processing, said seizing being performed when said at least one entrainer component is lowered into the path of said of flatfish.

7. An installation as claimed in claim 2, wherein said lowering of said at least one entraining component onto said flatfish occurs at one of the points of the tangent and of intersection between said path of said supply conveying means and said path of said at least one entraining component.

8. An installation as claimed in claim 4, wherein said lowering of said at least one entraining component onto said flatfish occurs at one of the points of the tangent and point of intersection between said path of said supply conveying means and said path of said at least one entraining component.

9. An installation as claimed in claim 1, wherein said at least one entraining component is arranged to be controlled with regard to its angle of turning during its form-fit engagement with said flatfish.

10. An installation as claimed in claim 1, wherein one of said processing tools for detaching said head is arranged fixedly beside said path of said at least one entraining component.

11. An installation as claimed in claim 1, wherein one of said processing tools for detaching said tail is arranged to be controlled with regard to its spacing from said path of said at least one entraining component by using a measured value of said fish detected by said detecting means.

* * * * *